US010723446B2

(12) United States Patent
El-Bakry

(10) Patent No.: US 10,723,446 B2
(45) Date of Patent: Jul. 28, 2020

(54) METHOD AND APPARATUS FOR DETERMINING A MOVEMENT DIRECTION OF A COMPONENT OF A MECHANISM

(71) Applicant: Airbus Operations Limited, Bristol (GB)

(72) Inventor: Murad El-Bakry, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 240 days.

(21) Appl. No.: 15/891,629

(22) Filed: Feb. 8, 2018

(65) Prior Publication Data

US 2018/0237129 A1 Aug. 23, 2018

(30) Foreign Application Priority Data

Feb. 17, 2017 (GB) .................................. 1702653.5

(51) Int. Cl.
*B64C 25/22* (2006.01)
*B64C 29/00* (2006.01)
(Continued)

(52) U.S. Cl.
CPC .............. *B64C 25/28* (2013.01); *B64C 25/22* (2013.01); *B64C 29/0091* (2013.01); *F04B 17/04* (2013.01); *F16K 11/07* (2013.01); *F16K 31/124* (2013.01); *F16K 37/0041* (2013.01); *B64C 2230/02* (2013.01); *B64C 2230/06* (2013.01); *F04B 9/10* (2013.01); *F15B 2013/0409* (2013.01)

(58) Field of Classification Search
CPC ..... B64C 25/28; B64C 25/22; B64C 29/0091;
B64C 2230/06; B64C 2230/02; F04B 17/04; F04B 9/10; F16K 37/0041; F16K 11/07; F16K 31/124; F15B 2013/0409
USPC .......................................................... 73/583
See application file for complete search history.

(56) References Cited

U.S. PATENT DOCUMENTS 4,950,885 A * 8/1990 Kershaw ................. G01D 5/268
250/227.25
5,161,127 A * 11/1992 Grosch .................... G01S 3/808
367/124
(Continued)

FOREIGN PATENT DOCUMENTS

JP 2016-3741 1/2016
SU 815543 B * 3/1981
WO WO 2016/011115 1/2016

*Primary Examiner* — Jacques M Saint Surin
(74) *Attorney, Agent, or Firm* — Nixon & Vanderhye P.C.

(57) ABSTRACT

An apparatus for determining a movement direction of a component of a mechanism. The apparatus includes an acoustic emission sensor arranged to detect acoustic emission from the mechanism, and a processor arranged to determine a Doppler shift in a frequency characteristic of the measured acoustic emission and to determine a movement direction of a component of the mechanism on the basis of the determined Doppler shift. A method of determining a movement direction of a component of a mechanism including detecting acoustic emission from the mechanism and determining a Doppler shift in a frequency characteristic of the measured acoustic emission and, determining, based on the Doppler shift in the frequency characteristic, a movement direction of the component of the mechanism.

34 Claims, 10 Drawing Sheets

(51) Int. Cl.
    *F04B 17/04*     (2006.01)
    *F16K 31/124*     (2006.01)
    *F16K 37/00*     (2006.01)
    *F16K 11/07*     (2006.01)
    *B64C 25/28*     (2006.01)
    *F04B 9/10*     (2006.01)
    *F15B 13/04*     (2006.01)

(56) References Cited

U.S. PATENT DOCUMENTS

| | | | |
|---|---|---|---|
| 2005/0117454 A1* | 6/2005 | Millikin | G01S 5/28 367/127 |
| 2007/0095138 A1* | 5/2007 | El-Bakry | G01H 1/00 73/583 |
| 2009/0070048 A1* | 3/2009 | Stothers | G01N 29/045 702/39 |
| 2013/0151203 A1* | 6/2013 | McEwen-King | G06F 17/00 702/189 |
| 2013/0340428 A1 | 12/2013 | Graichen et al. | |
| 2014/0182381 A1* | 7/2014 | Comeaux | G05B 23/0245 73/587 |
| 2015/0315963 A1 | 11/2015 | Graichen et al. | |
| 2016/0236794 A1* | 8/2016 | Tucker | B64D 45/00 |

\* cited by examiner

METHOD AND APPARATUS FOR DETERMINING A MOVEMENT DIRECTION OF A COMPONENT OF A MECHANISM

RELATED APPLICATION

This application claims priority United Kingdom (GB) Patent Application 1702653.5 filed 17 Feb. 2017, the entire contents of which is incorporated by reference.

TECHNICAL FIELD

The present invention relates to determining a movement direction of a component of a mechanism.

BACKGROUND

Mechanisms, such as valves, comprise a system of parts working together to perform a particular function. Fluidic valves are an example of such a mechanism.

Fluidic valves, such as hydraulic, directional control valves, regulate, direct, or control the flow of a fluid by opening, closing, or partially obstructing various passageways. Such valves allow fluid to flow, from one or more pressurized fluid sources, along different paths.

Typically, a fluidic valve, such as a directional control valve, comprises a spool located within a cylinder. The spool may be connected to an actuator which is mechanically or electrically controllable to change the position of the spool. Depending on the position of the spool, fluid from a pressurized fluid source may be directed along different paths. For example, fluid may be directed to different parts of a system in order that those different parts can perform work.

In order to understand and/or monitor the performance of a fluidic valve, it is desirable to understand how components, such as a spool in a directional control valve, behave as the valve is operated.

SUMMARY

A first aspect of the present invention provides an apparatus for determining a movement direction of a component of a mechanism, the apparatus comprising: an acoustic emission sensor arranged to detect acoustic emission from the mechanism; and a processor arranged to determine a Doppler shift in a frequency characteristic of the measured acoustic emission and to determine a movement direction of a component of the mechanism on the basis of the determined Doppler shift.

Optionally, the apparatus comprises a data acquisition system arranged to acquire data representative of amplitude values of the acoustic emission.

Optionally, the data acquisition system is arranged to acquire acoustic emission data at a data rate of substantially 10 Msps.

Optionally, the acoustic emission sensor is one of: a piezo-electric sensor; a fibre Bragg grating; and a laser vibrometer.

Optionally, the acoustic emission sensor has a peak frequency sensitivity in the range 0.3 MHz to 0.8 MHz.

Optionally, the acoustic emission sensor is mounted to detect acoustic emission substantially parallel with an axis of movement of the component of the fluidic valve.

Optionally, the apparatus is arranged to detect acoustic emission from an aircraft component.

Optionally, the apparatus comprises at least one acoustic emission sensor mounted on an end of a fluidic valve.

Optionally, the fluidic valve is a landing gear selector valve.

A second aspect of the present invention provides a method of determining a movement direction of a component of a mechanism, the method comprising: detecting acoustic emission from a mechanism caused by movement of a component of the mechanism; determining a Doppler shift in an identified frequency characteristic of the measured acoustic emission; and determining a movement direction of the component on the basis of the Doppler shift in the frequency characteristic Optionally, the method comprises measuring a time series of data representing amplitudes of the acoustic emission; and performing a transformation on the measured time series to generate plural frequency spectra, each frequency spectrum being for a different time interval.

Optionally, the method comprises identifying the frequency characteristic from each of the generated frequency spectra.

Optionally, the frequency characteristic is identified as being a peak in each of the respective frequency spectra.

Optionally, the frequency characteristic is identified as being a centroid of each of the respective frequency spectra.

Optionally, the method comprises determining the Doppler shift on the basis of a difference between the identified frequency characteristic and a peak sensitivity frequency of the sensor.

Optionally, the method comprises determining that the component is moving away from a sensor on the basis of the determined Doppler shift being toward a lower frequency than a peak sensitivity frequency of the sensor.

Optionally, the method comprises determining that the component is moving toward a sensor on the basis of the determined Doppler shift being toward a higher frequency than a peak sensitivity frequency of the sensor.

Optionally, the method comprises determining a speed at which the component is moving in the determined direction on the basis of the determined Doppler shift.

Optionally, the speed is determined according to:

$$U = \frac{af}{F'} - a$$

where U is the speed of the component, a is the effective speed of sound in the fluidic valve, f is the frequency of sound generated by the component, and F' is the measured acoustic emission from the fluidic valve.

Optionally, the method comprises determining a duration during which the Doppler shift is observable; and determining a distance moved by the component in the determined direction on the basis of the determined speed and the determined duration.

Optionally, the mechanism is a fluidic valve.

Optionally, the component is a component in a hydraulic valve.

Optionally, the component is a spool in a spool valve.

Optionally, the mechanism is a selector valve for an aircraft landing gear.

Optionally, the method comprises arranging a sensor to detect the acoustic emission substantially parallel to an axis of movement of the component of the fluidic valve.

A third aspect of the present invention provides an aircraft comprising an apparatus of the second aspect.

A fourth aspect of the present invention provides computer program which, when executed by a processor in an apparatus for determining a movement direction of a component of a mechanism, causes the processor to: receive a measurement of acoustic emission from the mechanism; determine a Doppler shift in a frequency characteristic of the measured acoustic emission; and determine a movement direction of the component on the basis of the Doppler shift in the frequency characteristic.

BRIEF DESCRIPTION OF THE DRAWINGS

Embodiments of the invention will now be described, by way of example only, with reference to the accompanying drawings, in which.

DETAILED DESCRIPTION

Figure 1:
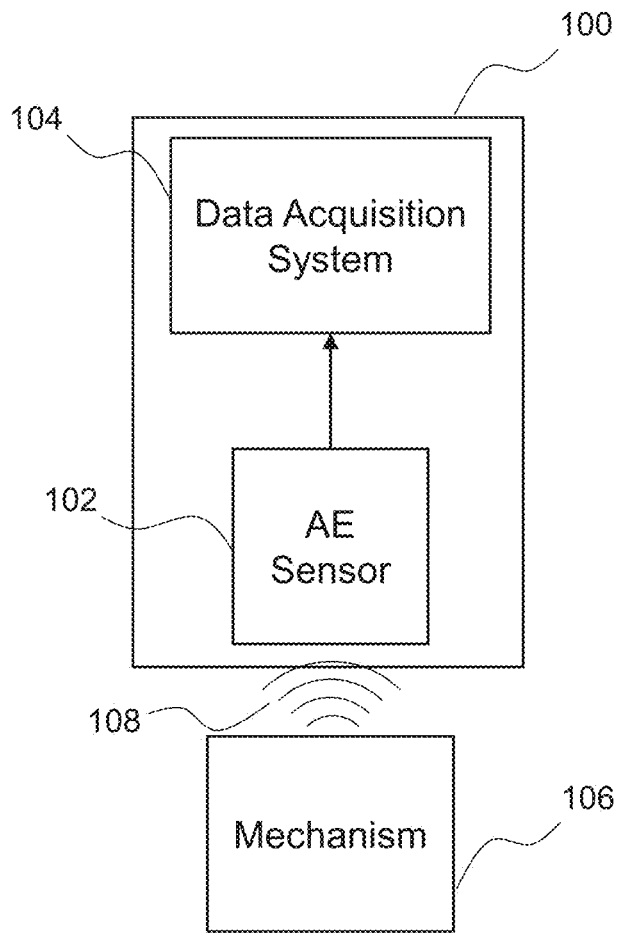
FIG. 1 is a schematic diagram of an example of an apparatus for determining a movement direction of a component of a mechanism according to an embodiment of the invention.

FIG. 1 is a simplified schematic diagram of an apparatus 100 for determining a movement direction of a component of a mechanism. The apparatus 100 comprises an acoustic emission (AE) sensor 102, a data acquisition module 104.

The AE sensor 102 may be any suitable transducer for converting acoustic emission into signals representing the acoustic emission. The AE sensor 102 may be a piezoelectric sensor with a pre-amplifier, for example, which generates an electrical output representative of the acoustic input. In other embodiments, the AE sensor 102 may be a fibre Bragg grating, a laser vibrometer, or any other suitable sensor.

The AE sensor 102 is coupled to the data acquisition system 104 to provide signals representing acoustic emission to the data acquisition system 104. For example, the AE sensor 102 may be coupled to the data acquisition system 104 via a cable. In some examples, the AE sensor 102 may be coupled to the data acquisition system 104 via a shielded co-axial cable comprising BNC connectors for connecting the cable to the AE sensor 102 at one end of the cable and to the data acquisition system 104 at the other end of the cable.

Although not shown, the data acquisition system 104 may comprise circuitry, including for example an analogue-to-digital-convertor (ADC), for converting into data the electrical signals received from the AE sensor 102 and appropriate memory for storing the data. The data acquisition system 104 may also comprise a processor running a program configured to process the data. For example, the processor may be programmed to perform one or more of the processes described below with reference to FIG. 4. In some embodiments, the data acquisition system can sample at a rate of up to 10 million samples per second (Msps).

In use, the AE sensor 102 is affixed at an appropriate location on an external surface of a mechanism 106 in order to sense acoustic emission 108 generated from within the mechanism 106. The location at which the AE sensor 102 is affixed to the mechanism 106 may depend on the component of the mechanism 106 that the AE sensor 102 is arranged to monitor and, in some examples, on an axis of movement along which that component is expected or known to move relative to other parts of the mechanism 106.

In some embodiments, the AE sensor 102 may be tuned to detect acoustic frequencies at which acoustic emission occurs but at which there is little or no background noise from the operation of a mechanism. One way in which acoustic emission may be detected at frequencies at which there is little or no background noise is to detect one or more harmonics of a fundamental frequency of the acoustic emission, which are in a region of the frequency spectrum which is spaced away from the noisier parts of the spectrum. The range of acoustic frequencies at which the AE sensor 102 is sensitive to acoustic emission can be any appropriate range. For example, the AE sensor 102 may be sensitive to acoustic emission in the range 100 kHz to 1000 kHz. In one example, the AE sensor 102 may be sensitive to acoustic emission in the range 300 kHz to 800 kHz. The AE sensor 102 may be sensitive to a range of acoustic frequencies around a peak frequency.

Figure 2:
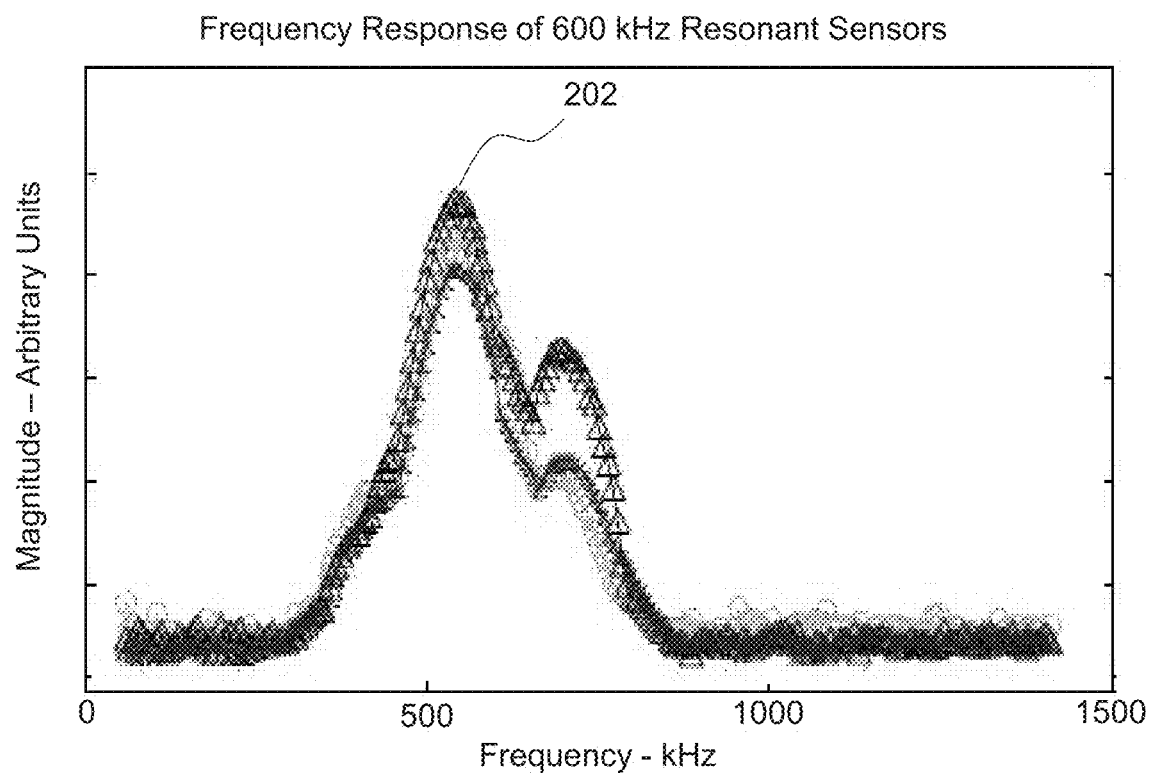
FIG. 2 is a graph showing a typical frequency response of an acoustic emission sensor suitable for use in an apparatus of an embodiment of the invention.

FIG. 2 is a graph showing a typical frequency response 200 of an AE sensor 102 suitable for use in the apparatus 100. The AE sensor 102 is a piezoelectric sensor having a peak sensitivity 202 at about 550 kHz. As can be seen, the AE sensor 102 is less sensitive at frequencies above and below the frequency of the peak sensitivity 202.

For the purpose of explanation, embodiments are described below with reference to a fluidic valve, which is an example of a mechanism with which the disclosed apparatus and methods may be used. However, in other embodiments, the mechanism may be any other type of mechanism. For example, the mechanism may be an internal combustion engine and the component may be a piston within the engine.

Figure 3A:
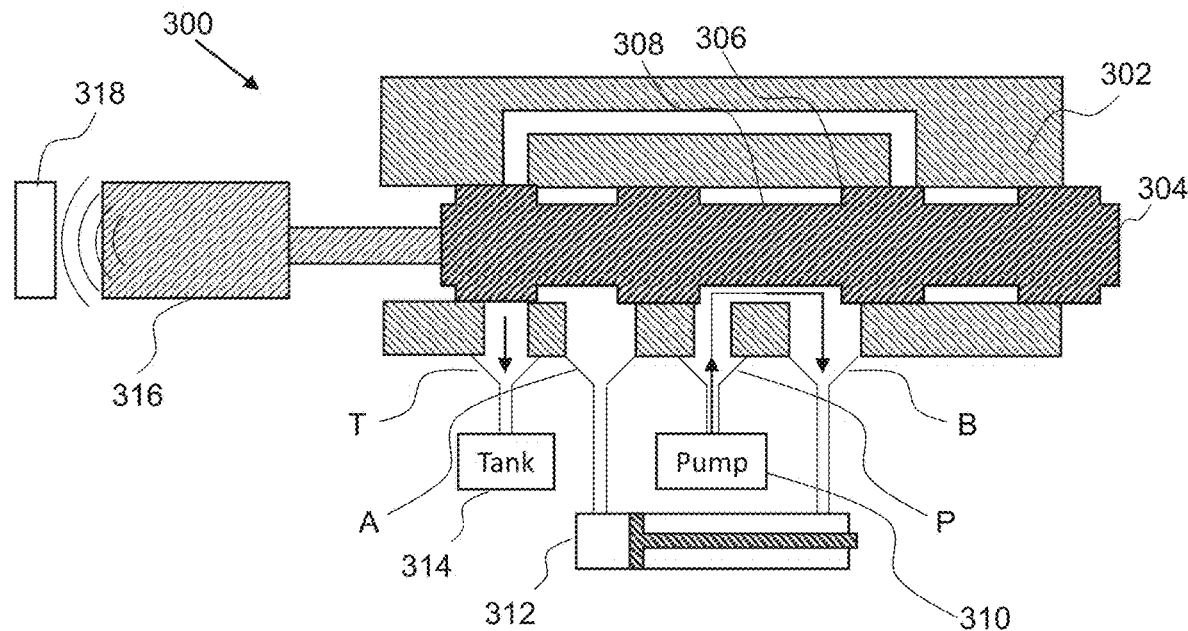
FIG. 3a is a schematic diagram of an example of a fluidic valve which an embodiment of the present invention may be used to monitor.
Figure 3B:
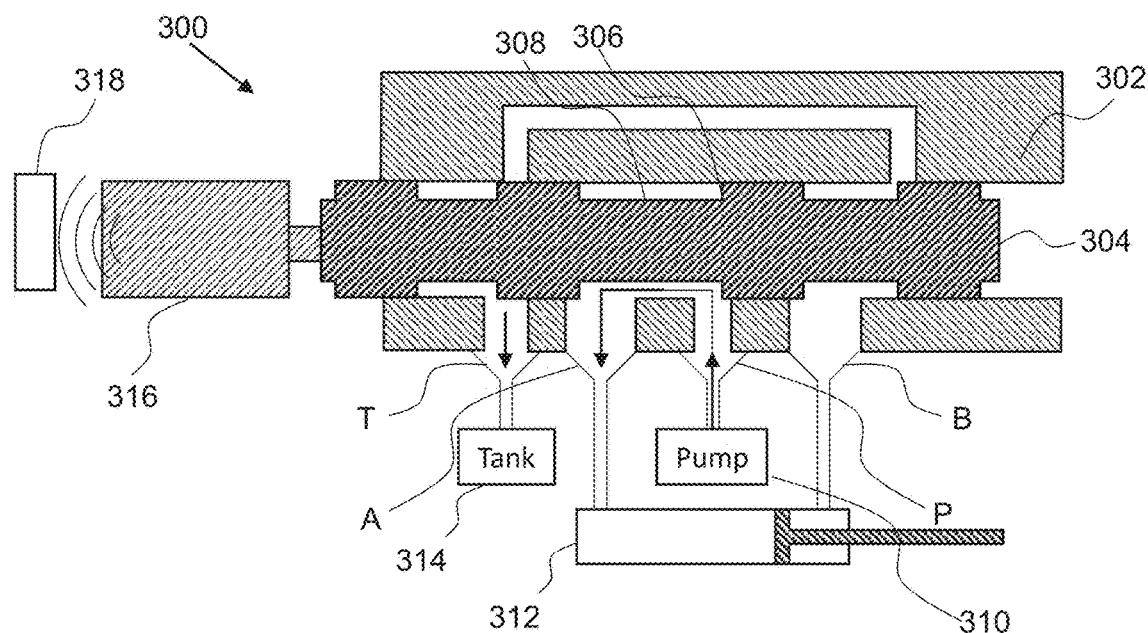
FIG. 3b is a schematic diagram of an example of a fluidic valve which an embodiment of the present invention may be used to monitor.

FIGS. 3a and 3b show the operation of a fluidic valve which the apparatus 100 described with reference to FIG. 1 may be used to monitor. In the examples shown in FIGS. 3a and 3b, the fluidic valve is a hydraulic directional control valve, referred to hereinafter as a valve 300. However, the apparatus 100 described above with reference to FIG. 1, and the methods disclosed herein, may be used to monitor any valve which has components moving within the valve.

The valve 300 comprises a valve body 302 and a spool 304. The spool 304 is located within a bore within the valve body 302 and is arranged to move along the longitudinal axis of the valve body 302. The spool 304 has an outer diameter at portions referred to herein as lands 306. The diameters of the lands 306 are selected to correspond with the bore of the valve body 302. Between the lands 306 are portions, referred to herein as undercuts 308, with diameters less than the outer diameter of the spool 304.

The valve 300 shown in FIG. 3 has four ports. One of the ports (labelled P) receives pressurised fluid from a pump 310. The pump 310 provides pressurised fluid, such as hydraulic fluid, to the valve 300. Two of the ports are work ports, labelled A and B, which provide pressurised fluid from the valve to other parts of a fluidic system. For example, the A and B ports may be connected to opposite ends of a piston actuator 312 shown in FIGS. 3a and 3b. The port labelled T is an exhaust port for providing a path for fluid to flow to a return tank 314.

The spool 304 can be moved by a solenoid valve 316, which is arranged to move the spool 304 axially within the bore of the valve body 302.

In the configuration shown in FIG. 3a, the solenoid valve is extended and the spool 304 is positioned so that there is a path for fluid to flow from the pump 310 via ports P and B to retract the piston actuator 312.

In the configuration shown in FIG. 3b, the solenoid valve is retracted and the spool 304 is positioned so that there is a path for fluid to flow from the pump 310 via ports P and A to retract the piston actuator 312.

In the example shown in FIGS. 3a and 3b, an AE sensor 318 is attached at an end of the valve 300 and arranged to sense acoustic emission emanating from the valve 300, including acoustic emission which is generated by the axial movement of the spool 304.

Figure 4:
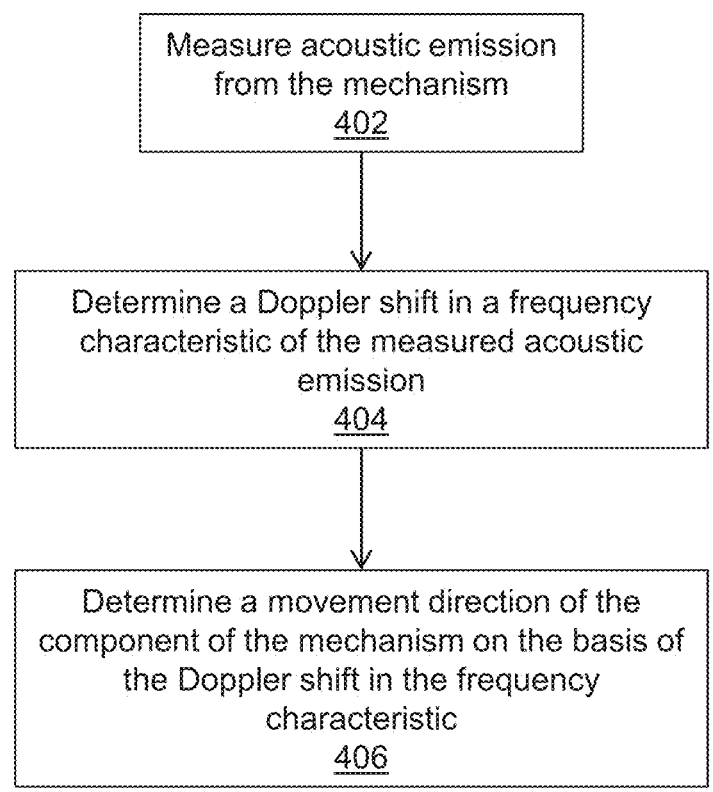
FIG. 4 is a flow diagram of a method of determining a characteristic of movement direction of a component of a mechanism according to an embodiment of the invention.

FIG. 4 is a flow diagram illustrating a method 400 of using the apparatus 100 described above with reference to FIG. 1 to determine a movement direction of a component of a mechanism. For example, the method 400 may be used to determine a movement characteristic of the spool 304 of the valve 300 described above with reference to FIG. 3.

At block 402, acoustic emission from the mechanism is measured. For example, acoustic emission may be measured using the AE sensor 318 during an operation of the valve 300.

Figure 5:
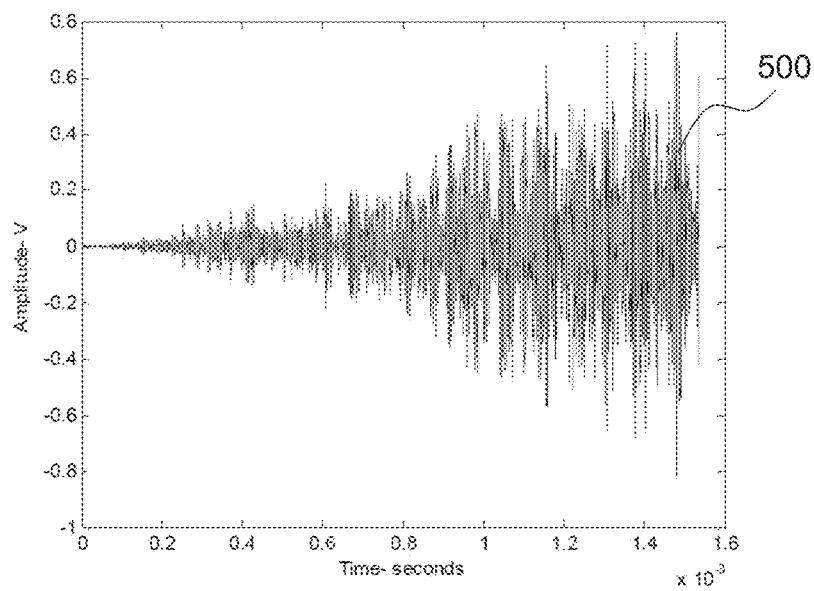
FIG. 5 are graphs of showing two examples of acoustic emission waveforms measured by an example apparatus of an embodiment of the invention.
Figure 5:
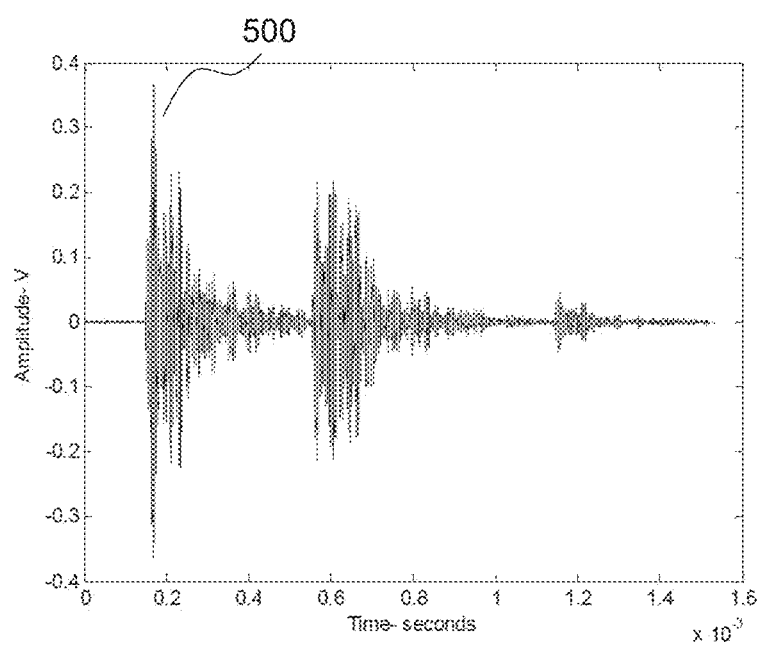

FIG. 5 shows two examples of acoustic emission waveforms 500 measured at different time intervals by an AE sensor 102 affixed to an example valve. The acoustic emission waveforms 500 represent a time series of data representing amplitudes of acoustic emission, as measured by the AE sensor 102. As can be seen from the two examples, acoustic emission waveforms 500 may exhibit different frequency contribution characteristics, may have different maximum amplitudes, and may have different durations.

Returning to FIG. 4, at block 404, a Doppler shift in a frequency characteristic of the measured acoustic emission is determined. Such a determination may be made by processing data representing the measured acoustic emission using the data acquisition system 104.

In some embodiments, the acoustic emission waveforms 500 for each time interval may be transformed from the time domain into the frequency domain. For example, a Fourier Transform may be applied to the acoustic emission waveforms 500 to generate a frequency spectrum for each acoustic emission waveform 500.

Figure 6:
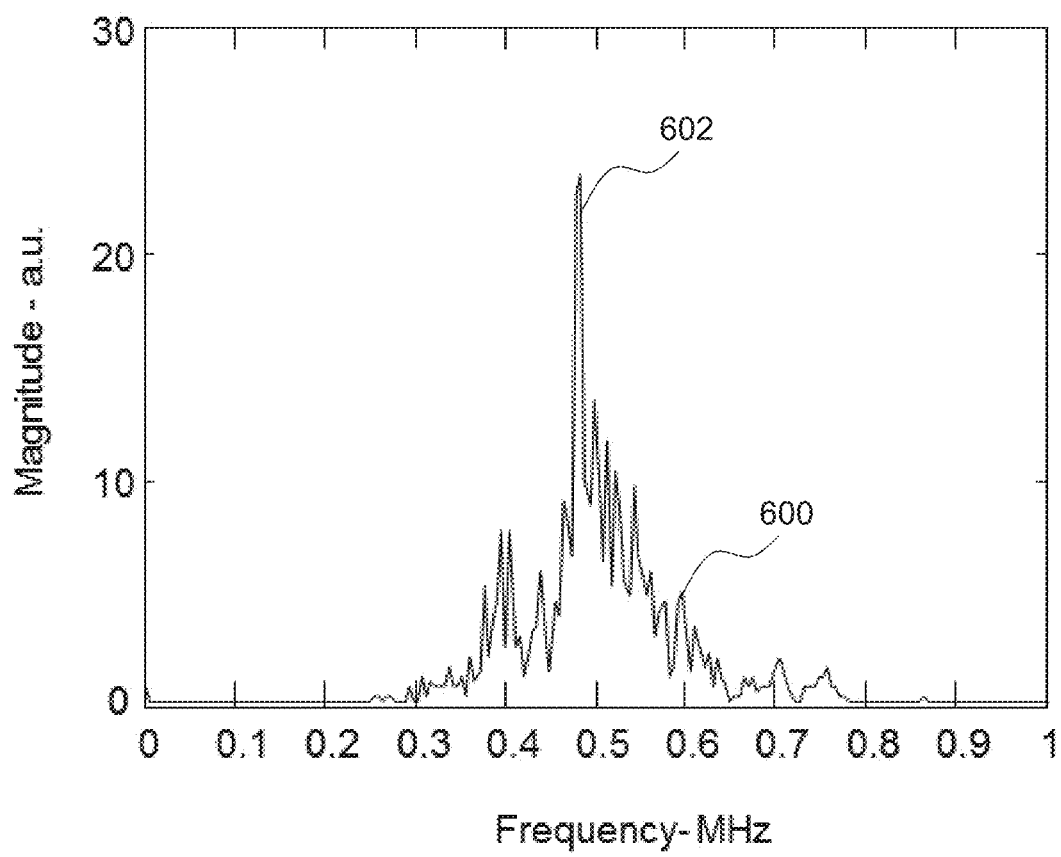
FIG. 6 is a graph showing an example of a frequency spectrum generated by an example apparatus of an embodiment of the invention.

FIG. 6 shows an example of a frequency spectrum 600 generated by performing a Fourier Transform on an acoustic emission waveform 500.

The frequency spectrum 600 may be used to identify a frequency characteristic of the acoustic emission for a given time interval. For example, a peak 602 of each frequency spectrum may be used to characterise the frequency spectrum 600 of the acoustic emission for each time interval. In another example, a centroid, determined using the equation:

$$F_C = \frac{\sum_{n=1}^{N} AF}{\sum_{n=1}^{N} A}$$

Where F is the frequency, A is the magnitude of the frequency, index n represents positions along the frequency spectrum abscissa ending with N.

Changes in the frequency characteristic 600, such as a shift in the peak 602 may indicate a Doppler shift of acoustic emission from the component of the mechanism. For example, referring to the valve 300 shown in the example of FIG. 3, acoustic emission from the spool 304 will appear, as measured by the AE sensor 318, to be shifted to a shorter wavelength as the spool moves from the configuration shown in FIG. 3a to that shown in FIG. 3b. Conversely, acoustic emission from the spool 304 will appear, as measured by the AE sensor 318, to be shifted to a longer wavelength as the spool moves from the configuration shown in FIG. 3b to that shown in FIG. 3a. Identifying such Doppler shifts may therefore provide information regarding movement of the spool 304 within the valve 300.

As the absolute frequency of acoustic emission from the spool is not necessarily known, in some embodiments a reference frequency may be used against which the frequency characteristic (such as the peak 602) may be compared. The source of acoustic emission from a component in a mechanism such as a valve is friction between the component and its housing. For example, in the valve 300 shown in FIG. 3, the source of acoustic emission from the spool 304 is friction between the spool 304 and the valve body 302. It has been appreciated that the peak sensitivity 202 of the AE sensor 102 may be used as an appropriate reference frequency, against which to determine a Doppler shift. The measured frequency of acoustic emission due to friction between the spool 304 and the valve body 302, and harmonics of that acoustic emission, will Doppler shift as the spool 302 moves. The Doppler shift causes a higher frequency when the spool 302 (or any other moving component being monitored) is moving towards the AE sensor 318 and a lower frequency when the spool 302 is moving away from the AE sensor 318.

Returning to FIG. 4, at block 406, a movement direction of the component of the mechanism is determined on the basis of the Doppler shift in the frequency characteristic.

Figure 7:
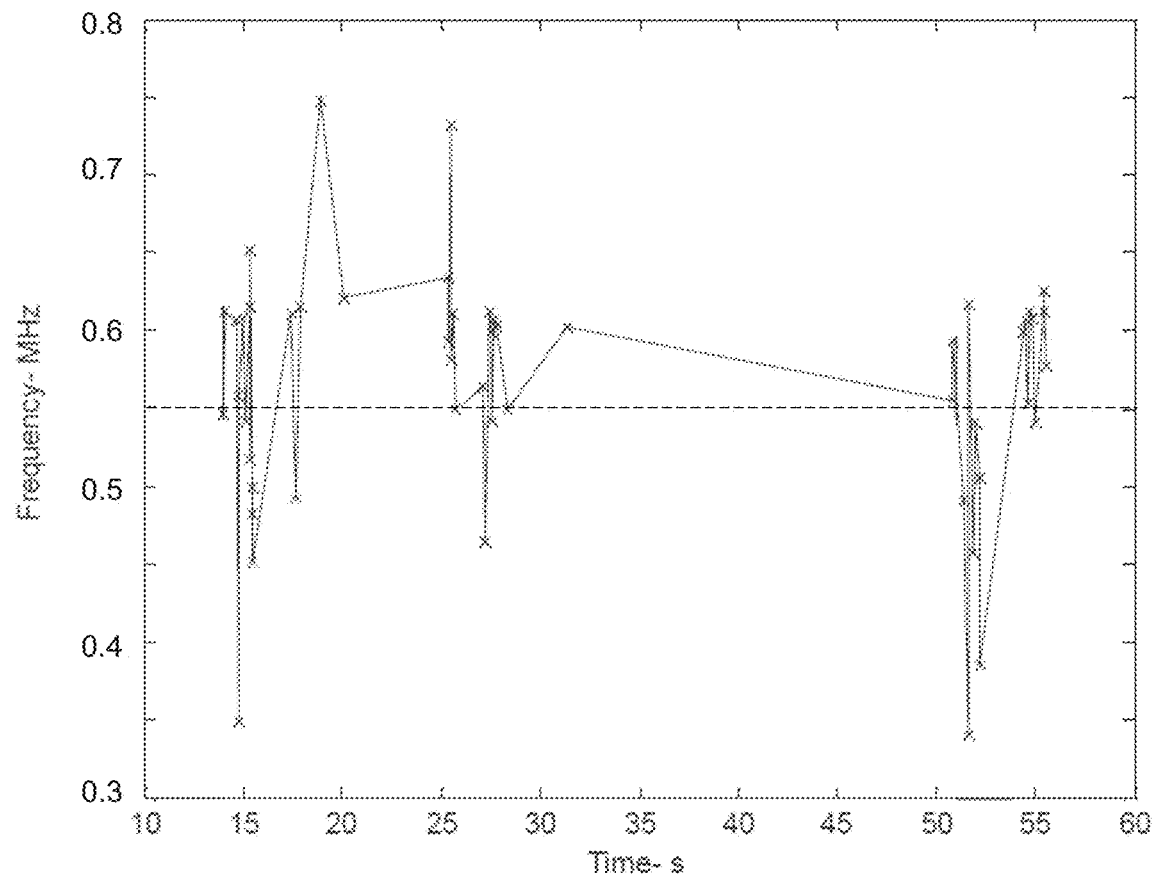
FIG. 7 is a graph showing the peak frequencies of frequency spectra plotted as a function of time.

FIG. 7 is a graph of the peak frequencies of frequency spectra plotted as a function of time. The frequency of the peak sensitivity 202 of the AE sensor 102 is shown with a dashed line, which, in the example shown in FIG. 7, is at 550 kHz.

Where the peak 602 or centroid of the frequency spectrum in a given time interval is below the frequency of the peak sensitivity 202 of the AE sensor 102, such that the Doppler shift is toward a lower frequency than the frequency of the peak sensitivity 202 of the AE sensor 102, it may be determined that the component is moving away from the AE sensor 102. Conversely, where the peak 602 or centroid of the frequency spectrum in a given time interval is above the frequency of the peak sensitivity 202 of the AE sensor 102, such that the Doppler shift is toward a higher frequency than the frequency of the peak sensitivity 202 of the AE sensor 102, it may be determined that the component is moving toward the AE sensor 102.

In some embodiments, the speed at which the component is moving in the determined direction may be computed on the basis of the determined Doppler shift. The relationship between the frequency of acoustic emission by the component of a fluidic valve, f, and the frequency of measured acoustic emission, F', is given by the Doppler equation:

$$F' = f\left(\frac{a}{a+U}\right)$$

Where α is the effective speed of sound through the mechanism (which may be affected by interfaces between the various components of the mechanism), f is the frequency of acoustic emission generated by the component (e.g. the spool), U is speed of the component, and F' is the measured frequency (e.g. of the peak or the centroid of the frequency spectrum) of the acoustic emission. The speed of sound is measured by measuring a difference in the arrival time of a generated signal between two sensors that are at a known distance apart. The generated signal could be generated by a function generator or lead break (Hsu-Neilson) source and transmitted with a transducer into the mechanism.

Rearranging the Doppler equation enables the speed of the component (e.g. spool) to be determined from the equation:

$$U = \frac{af}{F'} - a$$

Figure 8:
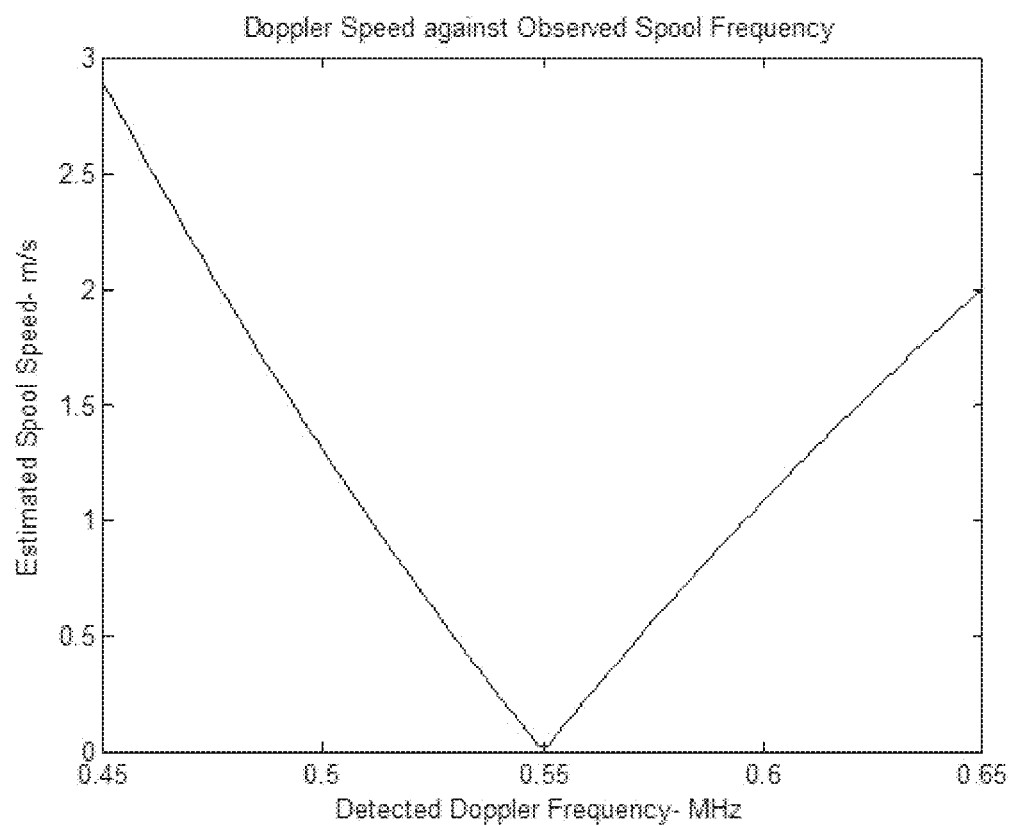
FIG. 8 is a graph showing calculated speed for a spool in a valve calculated using a method of an embodiment of the invention.

FIG. 8 is a graph showing calculated speed for a spool in a valve calculated using the method described above. In the example shown in FIG. 8, the AE sensor 102 has a peak sensitivity 202 at 550 kHz. As can be seen from FIG. 8, where the frequency of the measured acoustic emission from the spool is at the centre frequency of the AE sensor 102, the spool is stationary. FIG. 8 also shows that where the frequency of the measured acoustic emission from the spool is below the centre frequency of the AE sensor 102, the spool is moving away from the AE sensor 102 with a speed that varies according to the frequency and, where the frequency of the measured acoustic emission from the spool is above the centre frequency of the AE sensor 102, the spool is moving toward the AE sensor 102 with a speed that varies according to the frequency.

Figure 9:
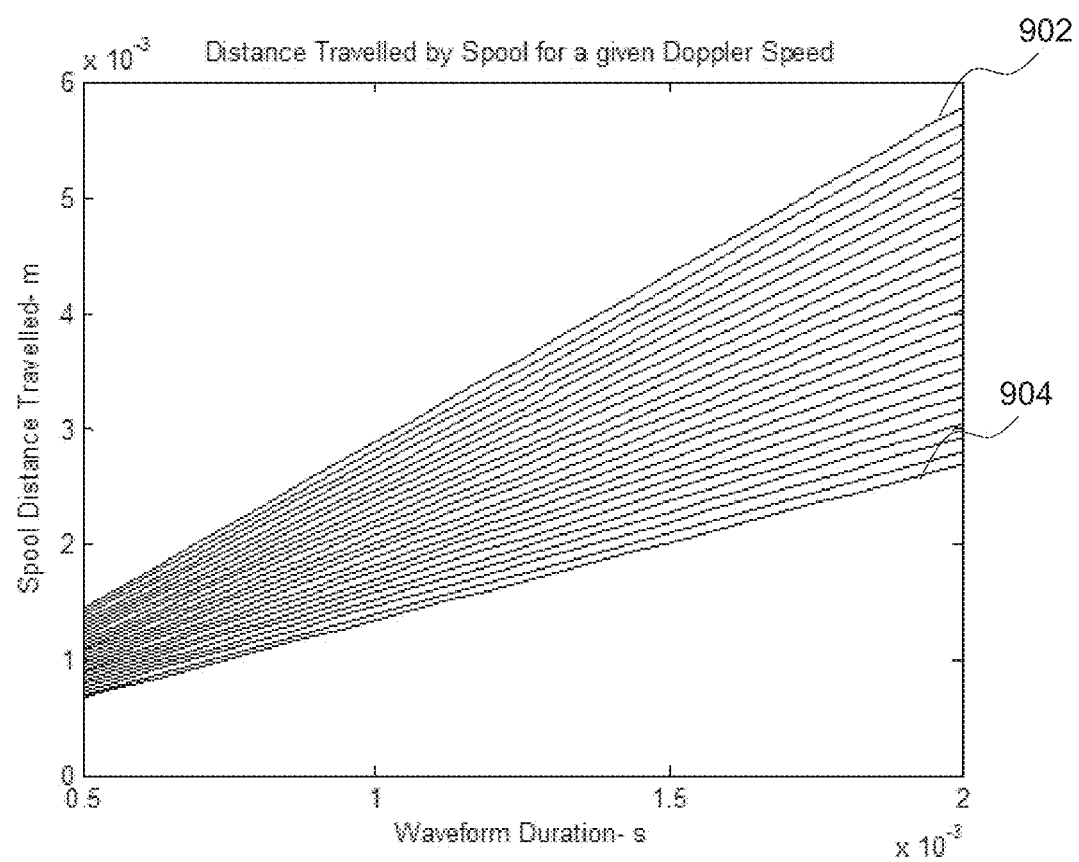
FIG. 9 is a graph showing calculated distance moved by a spool calculated for various spool speeds using a method of an embodiment of the invention.

Furthermore, by knowing the speed of the spool in the determined direction and the duration of the waveform in which the Doppler shift is observable, the distance moved by the component can be computed by taking the product of the speed and the waveform duration. FIG. 9 shows a series of lines plotting distance moved by a spool calculated for various spool speeds from a highest measured spool speed 902 to a lowest measured spool speed 904.

Although the examples described above are disclosed with reference to a single mechanism, in some examples, the data acquisition system 104 may be arranged to receive measurements of acoustic emission from two or more AE sensors 102. Multiple sensors may be located at various locations on a mechanism (such as a fluidic valve) and used to determine movement directions of multiple components within the mechanism. In some embodiments, a single AE sensor 102 may be used to monitor more than one component. In other embodiments, each AE sensor 102 may be used to monitor a single component.

Furthermore, the multiple AE sensors 102 may be used to verify characteristics of a particular component. For example, confirmation that a Doppler shift can be attributed to a particular component may be determined based on differing magnitudes of acoustic emission measured by different AE sensors 102 located at different locations on the mechanism.

In some embodiments, the mechanism may be a selector valve manifold for operations relating to extension and retraction of a nose landing gear of an aircraft. A selector valve manifold typically comprises a gear selector valve for hydraulic movement of the landing gear and a door selector valve for hydraulic movement of a door that covers the landing gear when the landing gear is retracted. The gear selector valve and the door selector valve each comprises a spool. The positions of the spools are controlled by pilot solenoid valves (PSVs). The selector valve manifold typically comprises a gear extend PSV, a door unlock PSV, a gear retract PSV, a door open PSV, a gear unlock PSV, and a door close PSV. Each of the PSVs is arranged to move the appropriate spool to an appropriate position to perform a desired function during an extension or retraction of the landing gear.

In some embodiments, each of the selector valves and each of the PSVs may be fitted with an AE sensor 102 arranged to sense acoustic emission from the relevant spool. This enables characterisation of the movement of the various components of the valve (i.e. spools) during each stage of an extension or retraction of the landing gear.

Figure 10:
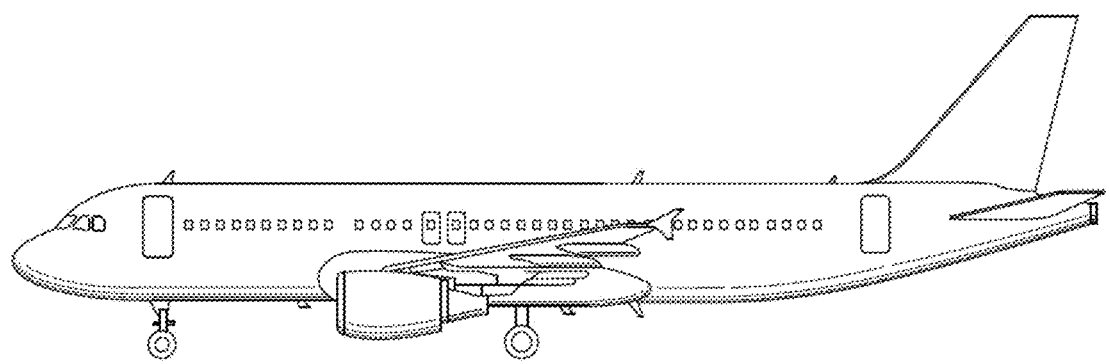
FIG. 10 is a schematic diagram of an example of a vehicle of an embodiment of the invention.

In some embodiments, the AE sensors 102 and data acquisition system 104 may be fitted to a mechanism in a vehicle. Referring to FIG. 10, there is shown a schematic side view of an example of a vehicle according to an embodiment of the invention. In the example of FIG. 10, the vehicle is an aircraft 1000. The aircraft 1000 may comprise one or more mechanisms, such as the valve 300 described above with reference to FIG. 3 or valve assemblies such as a selector valve manifold. The, or each, valve 300, or valve assembly, may comprise one or more AE sensors 102. In other embodiments, the vehicle may be other than an aircraft, such as a road vehicle, a rail vehicle, a watercraft or a spacecraft.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An apparatus for determining a movement direction of a component within a mechanism, the apparatus comprising:
    an acoustic emission sensor arranged to detect acoustic emission from the mechanism, wherein the acoustic emission sensor is located at the mechanism; and
    a processor arranged to determine a Doppler shift in a frequency characteristic of the measured acoustic emission and to determine a movement direction of the component of the mechanism on the basis of the determined Doppler shift.

2. The apparatus according to claim 1, further comprising a data acquisition system arranged to acquire data representative of amplitude values of the acoustic emission.

3. The apparatus according to claim 2, wherein the data acquisition system is arranged to acquire acoustic emission data at a data rate of substantially 10 Msps.

4. The apparatus according to claim 1, wherein the acoustic emission sensor is at least one of: a piezo-electric sensor; a fibre Bragg grating; and a laser vibrometer.

5. The apparatus according to claim 1, wherein the acoustic emission sensor has a peak frequency sensitivity in a range 0.3 MHz to 0.8 MHz.

6. The apparatus according to claim 1, wherein the acoustic emission sensor is oriented to detect acoustic emission parallel with an axis of movement of the component of the mechanism.

7. The apparatus according to claim 1, wherein the acoustic emission sensor is mounted on an end of a fluidic valve, the mechanism is the fluidic valve, and the movement direction corresponds to a movement of the component within the fluidic valve.

8. The apparatus according to claim 1, wherein the mechanism is an aircraft mechanism configured to be mounted to an aircraft and the component is a component of the aircraft mechanism, and the movement direction corresponds to a movement of the component within the aircraft mechanism.

9. The apparatus according to claim 8, wherein the aircraft mechanism is a landing gear selector valve.

10. An aircraft comprising an apparatus according to claim 1.

11. The apparatus according to claim 1, wherein the acoustic emission sensor is at least one of a piezo-electric sensor, and a laser vibrometer.

12. The apparatus according to claim 1, wherein the acoustic sensor is affixed to the mechanism.

13. A method of determining a movement direction of a component within a mechanism, the method comprising:
    detecting acoustic emissions from the mechanism caused by movement of the component within the mechanism, wherein the acoustic emissions are detected by an acoustic emission sensor located at the mechanism;
    determining a Doppler shift in an identified frequency characteristic of the detected acoustic emissions; and
    determining a movement direction of the component based on the Doppler shift in the frequency characteristic.

14. The method according to claim 13, further comprising:
    measuring a time series of data representing amplitudes of the acoustic emission; and
    performing a transformation on the measured time series to generate plural frequency spectra, each frequency spectrum of the frequency spectra being for a different time interval.

15. The method according to claim 14, further comprising identifying the frequency characteristic from each of the generated frequency spectra.

16. The method according to claim 15, wherein the frequency characteristic is identified as being a peak in each of the respective frequency spectra.

17. The method according to claim 15, wherein the frequency characteristic is identified as being a centroid of each of the respective frequency spectra.

18. The method according to claim 13, comprising determining the Doppler shift based on a difference between the identified frequency characteristic and a peak sensitivity frequency of the sensor.

19. The method according to claim 13, further comprising determining that the component is moving away from a sensor based on the determined Doppler shift being toward a lower frequency than a peak sensitivity frequency of the sensor.

20. The method according to claim 13, further comprising determining that the component is moving toward a sensor based on the determined Doppler shift being toward a higher frequency than a peak sensitivity frequency of the sensor.

21. The method according to claim 13, further comprising determining a speed at which the component is moving in the determined direction based on the determined Doppler shift.

22. The method according to claim 13, wherein the mechanism is a fluidic valve, and the movement direction corresponds to a movement of the component within the fluidic valve.

23. The method according to claim 22, further comprising arranging a sensor to detect the acoustic emission substantially parallel to an axis of movement of the component of the fluidic valve.

24. The method according to claim 13, wherein the mechanism is a hydraulic valve, and the movement direction corresponds to a movement of the component within the hydraulic valve.

25. The method according to claim 13, wherein the mechanism is a spool valve, the component is a spool in the spool valve, and the movement is a movement of the spool in the spool valve.

26. The method according to claim 13, wherein the mechanism is a selector valve for an aircraft component, and the movement direction relates to a movement of the component in the selector valve.

27. The method according to claim 26, wherein the selector valve is an aircraft landing gear.

28. The method of claim 13, wherein the step of detecting acoustic emissions uses an acoustic emissions sensor that is at least one of: a piezo-electric sensor; a fibre Bragg grating; and a laser vibrometer.

29. The method of claim 13, wherein the acoustic sensor is affixed to an external surface of the mechanism.

30. The method of claim 13, wherein the step of detecting acoustic emissions uses an acoustic emissions sensor that is at least one of: a piezo-electric sensor, and a laser vibrometer.

31. A method of determining a movement direction of a component of a mechanism, the method comprising:
    detecting acoustic emissions from the mechanism caused by movement of the component of the mechanism;
    determining a Doppler shift in an identified frequency characteristic of the detected acoustic emission;
    determining a movement direction of the component based on the Doppler shift in the frequency characteristic, and
    determining a speed at which the component is moving in the determined direction based on the determined Doppler shift, wherein the speed is determined according to:

$$U = \frac{af}{F'} - a$$

where U is the speed of a component, a is an effective speed of sound in a fluidic valve, f is a frequency of sound generated by the component, and F' is a measured acoustic emission from the fluidic valve.

32. A method of determining a movement direction of a component of a mechanism, the method comprising:
  detecting acoustic emissions from the mechanism caused b 7 movement of the component of the mechanism;
  determining a Doppler shift in an identified frequency characteristic of the detected acoustic emission;
  determining a movement direction of the component based on the Doppler shift in the frequent characteristic;
  determining a speed at which the component is moving in the determined direction based on the determined Doppler shift;
  determining a duration during which the Doppler shift is observable; and
  determining a distance moved by the component in the determined direction based on the determined speed and the determined duration.

33. An apparatus for determining a movement direction of a component within a mechanism, the apparatus comprising:
  an acoustic emission sensor arranged to detect acoustic emissions from the mechanism, wherein the is located at the mechanism, wherein the step of detecting acoustic emissions uses an acoustic emissions sensor that is at least one of: a piezo-electric sensor and a laser vibrometer; and
  a processor arranged to determine a Doppler shift in a frequency characteristic of the measured acoustic emission and to determine a movement direction of the component of with respect to the mechanism on the basis of the determined Doppler shift.

34. The apparatus of claim 33 wherein the acoustic emission sensor is affixed to the mechanism.

* * * * *